Feb. 7, 1950  G. A. PETERSON  2,496,813
PIPE JOINT
Filed Aug. 21, 1945
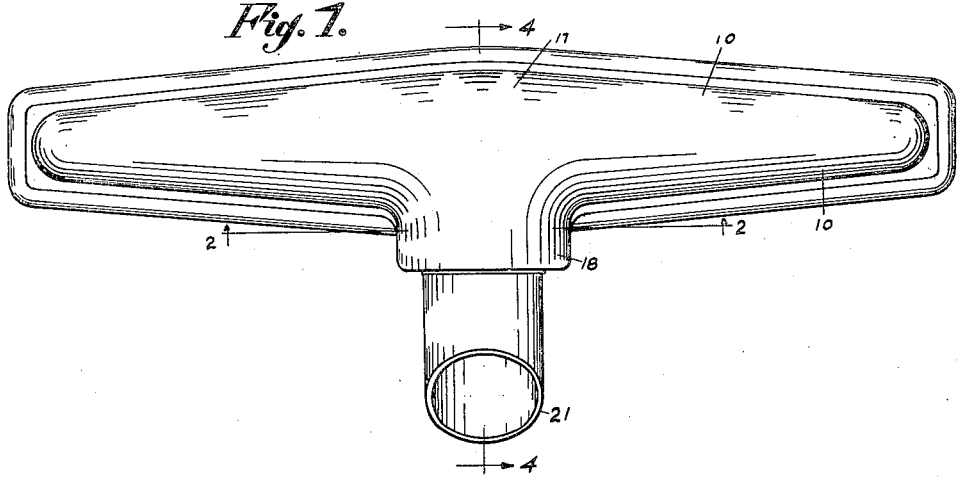
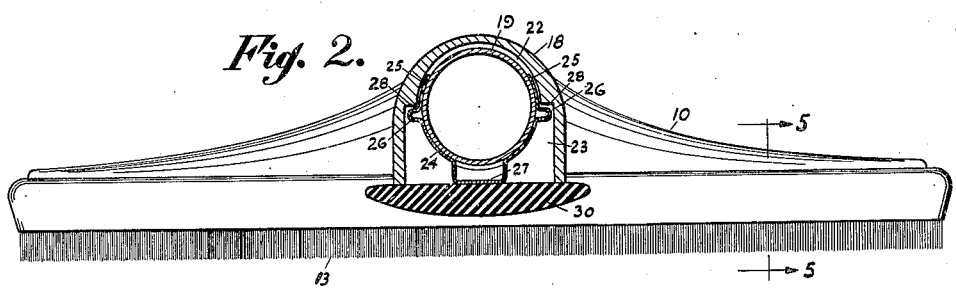
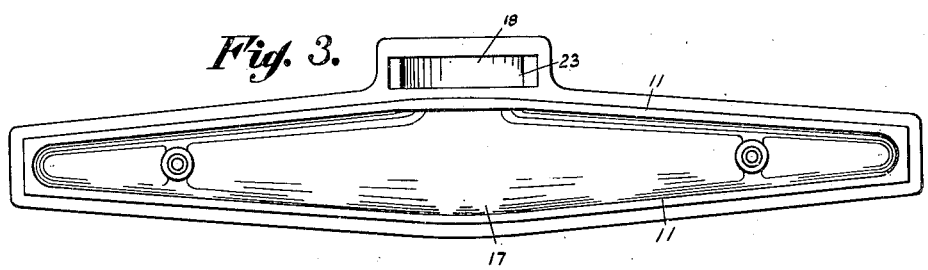
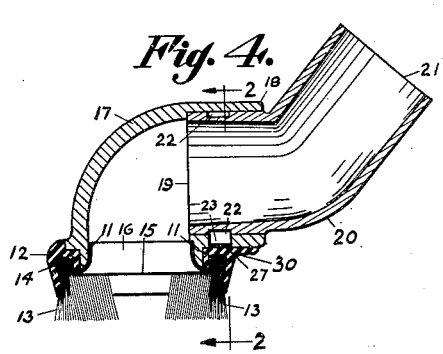
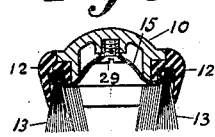
INVENTOR.
Gustav Axel Peterson
BY A. T. Sperry
ATTORNEY.

Patented Feb. 7, 1950

2,496,813

UNITED STATES PATENT OFFICE 2,496,813

PIPE JOINT

Gustav Axel Peterson, Stamford, Conn., assignor to Electrolux Corporation, Old Greenwich, Conn., a corporation of Delaware Application August 21, 1945, Serial No. 611,766

3 Claims. (Cl. 285—97.1)

This invention relates to suction nozzles for use with the hose or wand of a vacuum cleaner and is particularly concerned with the structural features and assembly procedure used in the manufacture of such nozzles.

In the mass production of nozzles of the type referred to, it is necessary in order to maintain production costs at a minimum to provide simplicity of construction together with a minimum number of parts and extreme facility in assembly and it is among the objects of the present invention to provide a nozzle assembly which satisfies these requirements.

It is a further object of the invention to provide a novel, simple, and improved suction nozzle embodying a swivel connection together with an assembly method by which the nozzle body and swivel may be readily secured together with a minimum of working operations.

Further and more specific object of the invention is to provide a spring clip arrangement for securing a swivel within a nozzle head so as to avoid the necessity of welding, riveting, or like operations in the assembly of the nozzle.

Numerous other features and advantages of the present invention will be understood from a consideration of the following specification taken in conjunction with the accompanying drawing, in which:

Fig. 1 is a top plan view of one embodiment of the present invention;

Fig. 2 is a sectional view taken on the line 2—2 of Figs. 1 and 4;

Fig. 3 is a bottom plan view of the nozzle body with the nozzle closure plate removed;

Fig. 4 is a vertical section taken on the line 4—4 of Fig. 1, and

Fig. 5 is a similar section taken on the line 5—5 of Fig. 2.

The present inventive concept may be briefly defined as involving a swivel suction member having an annular recess adjacent one end, which end is adapted to be inserted within the nozzle body together with a spring clip, the arms of which engage within the recess. The clip is retained within the head and thus retains the swivel by the simple application of the nozzle closure plate which in the present form of invention carries bristles whereby the nozzle constitutes a floor brush.

In that form of the invention herein shown by way of illustration, the nozzle body is indicated by the numeral 10 and may be formed by a simple metal stamping or die casting. However, if desired the body 10 may be produced from non-metallic material in the nature of a thermoplastic. The body is of elongated design being internally dish shaped to constitute a shell, the end portions of which are substantially concave as shown in Fig. 5. Spaced slightly inwardly from the peripheral edge of the body is a depending guide flange 11 which receives thereover a rubber bead portion 12 of the bristle carrying closure plate 15. The bristles 13 are retained within a channel 14 of the closure plate 15 by suitable means such as a peripherally extending wire. The closure plate 15 is centrally apertured as at 16 (see Fig. 4) to permit ingress of air through the closure plate and to the central body portion 17 of the nozzle.

The central body portion of the nozzle extends rearwardly from the body to form a cylindrical swivel receiving head 18 within which is inserted the tubular inner end 19 of the angularly bent swivel 20, the opposite end 21 of which is slightly tapered and is adapted to receive the hose or wand of a vacuum cleaner. The inner end 19 of the swivel 20 is provided with an annular recess 22 spaced slightly from the extremity and so located as to be normally positioned wholly within the head 18 of the body and preferably in the plane of the central rear portion of the bead 12. In line with the location of the recess 22, the lower wall of the head 18 is cut away to form an elongated rectangular opening 23.

For retaining the swivel within the head 18, a spring clip 24 is provided which is substantially U-shaped, the side arms 25 being curved to conform with the curvature of the recess 22. Each arm 25 is provided with an extending return bent lug 26 substantially midway of the arms. The lower ends of the arms are joined by a substantially rectangularly bent central base 27.

When the device is assembled as shown in Fig. 2, the arms fit within the recess 22 of the end 19 of the swivel while lugs 26 engage shoulders 28 formed within the opening of the head 18 while the base piece 27 is secured in position by the application of the closure member 15 which may be suitably secured on the body by means of screws 29.

In the assembly of the present nozzle, the end 19 of the swivel 20 is inserted within the head 18, and the clip 24 is inserted through the opening 23 by simple pressure, the arms 25 expanding to pass over the diameter of the recess 22 and thereafter contracting to fit within the recess 22. Rotary movement of the swivel is thus permitted within the head while the clip is retained against such rotary movement by the lugs 26 which engage the shoulders 28. Thereafter the application and securement of the closure 15 causes a central rear portion 30 of the bead 12 to engage the outer face of the base 27 of the clip to retain the clip in position. It will thus be seen that there is no necessity for any special securing operations or the use of any special securing means for the clip since the application of the closure plate secures the clip in its position as shown in Fig. 2. It will be also noted that the nozzle may be readily disassembled by an equal minimum of operations and effort since it is only required that the closure plate be removed. The clip may then be taken out by simple straight outward pulling upon the base 27, thus releasing the end 19 of the swivel which may then be withdrawn from the head 18.

From the foregoing specification, it will be seen that the present invention provides a novel, simple and efficient construction having a minimum number of parts and further providing a construction which lends itself to a novel, simple and improved mode of assembly.

In considering the present invention it will, of course, be understood that the invention is not limited to any specific structural details herein shown by way of illustration and that the invention is not limited to its use as applied to floor brushes since a like construction and method of assembly may be equally applicable to other types of nozzles. Therefore, it will be understood that numerous changes, modifications and the full use of equivalents may be resorted to in the practice of the invention without departure from the spirit or scope thereof as outlined in the appended claims.

What I claim is:

1. In a suction nozzle, a hollow body member having a swivel receiving opening and a clip receiving opening adjacent said swivel receiving opening, a swivel member positioned in said swivel opening, a clip within said body adjacent said clip receiving opening and a closure plate for said clip receiving opening.

2. In a suction nozzle, a hollow body member having a swivel receiving opening and a clip receiving opening adjacent said swivel receiving opening, a swivel member positioned in said swivel opening, a clip within said body adjacent said clip receiving opening and a closure plate for said clip receiving opening, said swivel member having an annular groove and said clip member being engageable with said groove to prevent displacement of said swivel.

3. In a suction nozzle, a hollow body member having a swivel receiving opening and a clip receiving opening adjacent said swivel receiving opening, a swivel member positioned in said swivel opening, a clip within said body adjacent said clip receiving opening and a closure plate for said clip receiving opening, said closure plate extending across the mouth of the nozzle.

GUSTAV AXEL PETERSON.

REFERENCES CITED

The following references are of record in the file of this patent:

UNITED STATES PATENTS

| Number | Name | Date |
| --- | --- | --- |
| 1,259,645 | McArthur | Mar. 19, 1918 |
| 2,021,241 | Mall | Nov. 19, 1935 |
| 2,237,725 | Cranmer | Apr. 8, 1941 |
| 2,260,038 | Lang | Oct. 21, 1941 |
| 2,318,317 | Lofgren | May 4, 1943 |